United States Patent [19]

Miller

[11] Patent Number: 4,906,371
[45] Date of Patent: Mar. 6, 1990

[54] FILTER ELEMENT HAVING MICROPOROUS MEMBRANE

[75] Inventor: Matthew J. Miller, Cheshire, Conn.

[73] Assignee: Cuno, Incorporated, Meriden, Conn.

[21] Appl. No.: 339,928

[22] Filed: Apr. 17, 1989

Related U.S. Application Data

[63] Continuation of Ser. No. 88,498, Aug. 17, 1987, abandoned, which is a continuation of Ser. No. 383,377, May 28, 1982, abandoned.

[51] Int. Cl.$^4$ .............................................. B01D 13/00
[52] U.S. Cl. ........................... 210/321.61; 210/321.86; 210/321.87; 210/485; 210/489; 210/493.2; 210/497.01; 210/500.21
[58] Field of Search ...................... 210/433.1, 446, 448, 210/485, 487, 489, 493.1–493.5, 497.1, 497.01, 500.21, 503, 321.61, 505, 321.86, 321.87

[56] References Cited

U.S. PATENT DOCUMENTS

| | | | |
|---|---|---|---|
| 3,415,384 | 12/1968 | Kasten | 210/492 |
| 3,526,588 | 9/1970 | Michaels | 210/500.2 |
| 4,154,688 | 5/1979 | Pall | 210/487 |
| 4,305,782 | 12/1981 | Ostreicher et al. | 210/505 |

Primary Examiner—Richard V. Fisher
Assistant Examiner—Wanda L. Millard
Attorney, Agent, or Firm—Weingram & Zall

[57] ABSTRACT

A filter element containing a hydrophilic nylon microporous filter membrane having a preformed substantially non-porous sealing area of non-porous tape heat sealed to the membrane and a filter housing having preferably a hydrophobic thermoplastic sealing surface in thermoplastic sealing relationship with the sealing area. Preferably, the filter membrane is a pleated cylindrical membrane and the housing includes endcaps thereto. The preferred pleated cylindrical membrane is produced from an elongated porous filtration area longitudinally bordered by the substantially non-porous sealing areas. Such a membrane may be produced by applying a heat sealable non-porous tape along the longitudinal borders of the filtration area. The filter element is particularly useful for the filtration of aqueous liquids, particularly parenteral or body liquids.

7 Claims, 2 Drawing Sheets

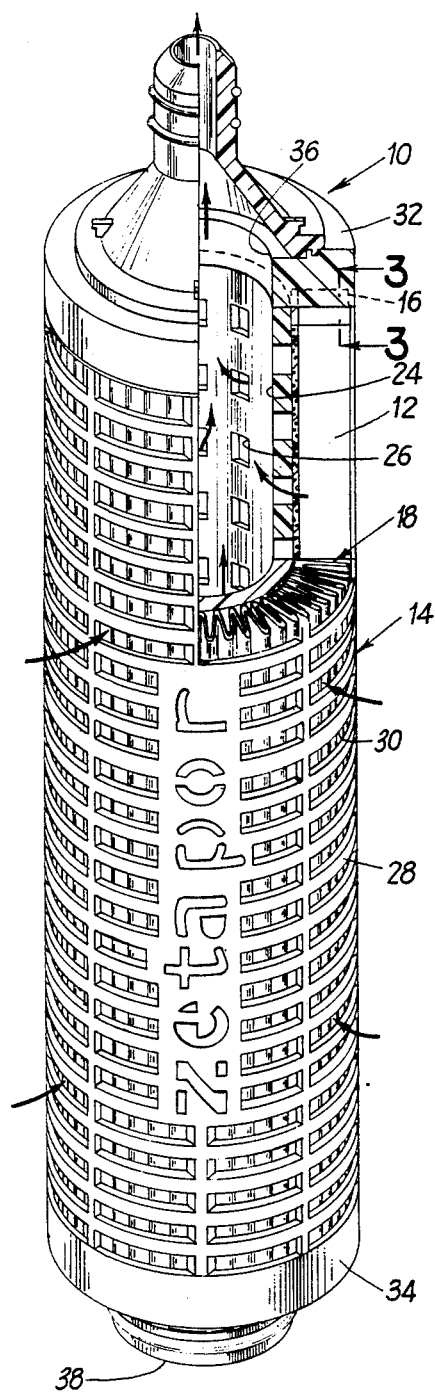
FIG. 1
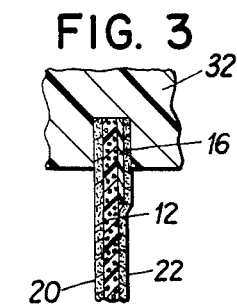
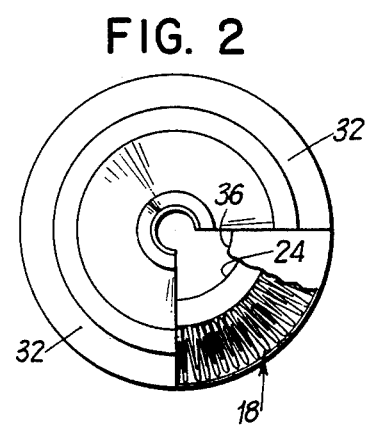

FILTER ELEMENT HAVING MICROPOROUS MEMBRANE

This is a continuation of co-pending application Ser. No. 07/088,498 filed on 8/17/87, now abandoned, which is a continuation of Ser. No. 383,377 filed May 28, 1982, now abandoned.

RELATED APPLICATIONS

This application describes and claims a preferred subgenus of the generic invention described and claimed in U.S. Ser. No. 383,383 to Meyering et al, filed May 28, 1982 and now abandoned, the entire disclosure of which is incorporated herein by reference.

FIELD OF THE INVENTION

This invention relates to filter elements utilizing hydrophilic microporous membrane as the filtration media, and more particularly to filter elements utilizing cylindrical pleated nylon membrane, said filter elements being suitable for the filtration of aqueous fluids, in particular parenteral or body liquids.

PRIOR ART

In many applications it is necessary to totally remove particles having dimensions in the submicrometer range. For this purpose, it is well known in the art to use a thin polymeric layer that is rendered highly porous with a substantially uniform pore size. Such layers are commonly termed microporous filtration membrane.

One characteristic of such microporous filter membrane is that they are extremely fragile and easily rupture when subjected to deformation due to rough handling, bending, or fluid pressure. Since even the most minute crack or break will destroy the effectiveness, it is necessary to use extreme care in manufacture and use.

Microporous filter membrane find many uses in industry, science and education. A common industrial application is the "cold" sterilization of pharmaceuticals and the stabilization of alcoholic beverages. In cold sterilization, the membrane has a sufficiently small pore size to block the passage of all bacteria present in the unfiltered fluid supplied to the upstream side. In the production of alcoholic beverages, the removal of bacteria, yeast and molds, stabilizes and clarifies the beverage. In the production of pharmaceuticals, the removal of bacteria is an essential step for obvious health reasons. In all of these applications it is essential that the filter membrane used be hydrophilic in order to filter such aqueous fluids.

There are many types of filter membranes available and processes for producing such membrane.

Nylon microporous filter membrane is well known in the art, for example, U.S. Pat. No. 3,876,738 to Marinaccio et al (1975) describes a process for preparing nylon microporous membrane by quenching a solution of a film forming polymer in a non-solvent system for the polymer. European Patent Application 0 005 536 to Pall (1979) describes a similar type process for producing nylon membrane.

Other type polymeric microporous membranes, including nylon and processes for producing such membranes are described, for example in the following U.S. Pat. Nos.:

3,642,668 to Bailey et al (1972);
4,203,847 to Grandine, II (1980);
4,203,848 to Grandine, II (1980); and
4,247,498 to Castro, (1980).

Commercially available nylon microporous filter membranes are available from Pall Corp., Glencove, N.Y., under the trademark ULTIPOR $N_{66}$ and $N_{66}$ POSIDYNE. Another commercially significant filter membrane made of polyvinylidene fluoride is available from Millipore Corp., Bedford, Mass., under the trademark DURAPORE. This membrane is probably produced by the aforementioned Grandine, II patents.

Additionally, the Assignee of this application is selling cationically charged modified nylon microporous filter membrane under the trademark ZETAPOR. These membranes are described and claimed in U.S. Ser. No. 268,543 filed on May 29th, 1981 to Barnes et al, now U.S. Pat. No. 4,473,475; and U.S. Ser. No. 314,307 filed on Oct. 23, 1981 to Ostreicher et al, now U.S. Pat. No. 4,473,474. Barnes et al describes the use of charged modified membrane for the filtration of high purity water (18 megohmcentimeter resistivity) used in the electronics industry; and Ostreicher et al describes the use of charged modified membrane for the filtration of parenteral or body liquids. Additionally, it should be noted that these filter membranes are typically reinforced by various means. A unique method of reinforcement is described in the Assignee's U.S. Ser. No. 332,068, filed Dec. 18, 1981 to Barnes et al, now abandoned.

All of the aforementioned membranes, besides being used in sheet form, are used in various type filter elements. Generally, the filter element comprises the filter membrane and a filter housing with a sealing surface in sealing relationship with a sealing area of the membrane. A well known type filter element is the pleated cartridge type filter element described, for example, in U.S. Pat. No. 3,457,339 to Pall et al (1969). Another well known type of filter element is the hermetically sealed intravenous unit described in U.S. Pat. No. 4,113,627 to Leason (1978).

In the critical applications for such filter elements, it is imperative that the filter membrane not be damaged during production and that the filtrate not bypass the filter membrane. Either situation could be catastropic, for example, allowing contaminants to enter the blood stream of a patient. It is therefore necessary that an undamaged seal exist between the sealing area of the membrane and the sealing surface of the filter housing to prevent leakage around the filter membrane. In order to insure such integrity, the filter element is "integrity tested" to insure the integrity of the filter element. This is generally accomplished by a "bubble point" test of the filter element by methods well known in the art. A particular type of integrity testing device for filter cartridges is commercially available under the name ZETAWATCH, from AMF Cuno Division, Meriden, Conn. and described and claimed in the Assignee's co-pending U.S. Ser. No. 265,481, filed May 20, 1981, to Kowalski, now U.S. Pat. No. 4,384,474. This integrity tester is self contained and electrically monitors the individual cartridge elements's integrity within a multiple cartridge housing. Other methods of such integrity testing are described in "Non-Destructive Test For Bacterial Retentive Filters" by Ben Trasen which was published in the Sept./Oct. 1979 issue of the Journal of Parenteral Drug Association, pages 273-2798. All of the known integrity tests require a thorough wetting of the membrane and sealing surfaces associated therewith to provide an accurate determination of integrity. If the filter membrane is broken, even microscopically, if the membrane is improperly installed, or if the membrane sealing surfaces are not completely wetted, bubbles will appear immediately at the point of the break or leak.

Additionally, any filter element must, particularly when used to filter parenteral or biological liquids, have a minimum of extractable contaminants introduced into the filtrate. These contaminants may be harmful toxins when introduced into a patient. Specifically, any filter element must meet the test standards of the industry, e.g. ASTM D-3861-79.

Still further, filter elements used to filter parenteral or biological liquids should be heat sterilizable and autoclavable, without deterioration or discoloration of the housing or membrane or deterioration of the seal between the membrane and housing. A preferred housing material is polypropylene which is hydrophobic.

Several methods of sealing filter elements have been employed in the past. These methods include pressure clamping, heat sealing, ultrasonic welding, adhesive and solvent bonding, and injection molding. These prior art methods fail to provide on occasion the 100% positive seal which is necessary to prevent leakages. In particular where microporous filter membranes are used in the filter element, there is some danger when using these methods that the delicate filter media will be damaged during the sealing process.

Known methods of pressure clamping and other mechanical interlocking systems tend to distort the filter membrane or actually damage the membrane at the clamping edges, thereby destroying the integrity of the membrane and allowing contaminants to pass through. Also conditions such as time, and heat stress relieving can allow the pressure seal to relax. Additionally, this method is particularly complicated when a pleated filter cartridge is assembled. Known methods of heat sealing, sonic welding and related thermomechanical bonding methods may also damage the filter membrane at the sealing edges. The use of adhesives or solvent bonding has disadvantages in that another material is introduced into the filter element that can lead to extractable contaminants. Often the constituents of an adhesive or solvent system may also damage the filter membrane.

The foregoing methods of sealing the filter housing to a filter membrane are particularly troublesome when a hydrophobic sealing surface is in contact with a hydrophilic sealing area. This is often the case when the filter element is used to filter biological or parenteral liquids where it is very highly desirable to use a polypropylene housing (which is resistant to autoclaving and heat sterilization) and undesirable to use adhesives or solvents for sealing (to avoid high extractables). For such elements, the housing is usually thermoplastically sealed to the membrane, increasing the chances for damage to the sealing areas of the membrane. Additionally, it appears that the hydrophobic sealing surface of the housing in contact with the porous hydrophilic sealing area of the membrane increases the chances that the filter element will not pass industry integrity tests. This is probably brought about by the incomplete wetting of the membrane/housing interface which gives a reduced bubble point. For example, it has been found that in the thermoplastic sealing of polypropylene end caps to cylindrical pleated nylon membrane filter cartridges, an unacceptably low percentage of the cartridges passed the industry integrity test.

More specifically, the following prior art references are relevant to the invention described and claimed herein.

U.S. Pat. No. 1,476,392 to Carroll (1923) describes a process of making a composite film by casting a plastic or flowable cellusoic material, e.g. cellulose acetate, on to a moving wheel from a plurality of compartments to thereby produce a plurality of adjacent film strips. This reference does not teach or suggest the production of a microporous filter membrane.

U.S. Pat. No. 2,663,660, to Layte (1953) describes a method of assembling filter elements, e.g. a filter cartridge, by producing an elongated strip of filter paper and folding elongated tapes of adhesive material on the elongated edges. The filter paper is then cut to size and pleated transversely of the length of the strip, and rolled into an annulus form. The outer portions of the adhesive tape material is then moistened with a suitable solvent material for the adhesive material of which the tapes are formed and thereafter the ends of the annulus are capped by end caps. The end caps are preferably heavy cardboard. Layte does not teach or suggest the use of such a method in conjunction with microporous membrane nor is such a method suitable for producing filter cartridges for filtering parenteral or biological liquids wherein extractables must be minimized.

U.S. Pat. No. 3,013,607, to Jackson et al (1961) relates to a method of end capping tubular filter elements of paper, cardboard, felt, woven tissue, etc. Thermoplastic end caps are subjected to heat induced in the field of an electric inductance coil in contact with the cap, to a point where the cap is softened so that the edges of the filter can be embedded in the cap to the depth required to bind the parts together. A metallic strip is applied to the edges of the filter and external support jacket, or the edges of the filter element and external support jacket are coated with an electrically conductive or semiconductive material, so as to reinforce the filter edges, and enhance the heat conductivity through the edges and end cap. Jackson et al does not utilize an organic polymeric microporous filter membrane and thus does not recognize the problems associated with the integrity testing of filter elements containing such hydrophilic membrane in conjunction with a hydrophobic end cap.

Additionally, the use of a metalic strip on the edges of the Jackson et al filter limits greatly the application to which the end capped filter elements can be put. For example, under certain conditions, the metallic strip can corrode and/or contaminate the material being filtered or the medium being filtered. Such a filter element is completely unacceptable for the filtration of biological and parenteral liquids. Still further the use of such a metalic strip on the edges of the filter elements increases the cost of making the filter elements, and complicates the procedure used in corrugating such filter elements.

U.S. Pat. No. 3,407,252 to Pall et al (1968) describes the production of a corrugated or pleated filter media in annulus form which utilizes a ribbon or tape of bonding agent such as a heat sealable and curable epoxy resin, to form a leak-proof seal along the longitudinal meeting of the pleated filter media.

U.S. Pat. No. 3,457,339 to Pall et al (1969) describes a process for applying preformed end caps to filter sheet material, particularly sheet materials formed of fiber and in substantially tubular shape. The process involves heating the inside face of the thermoplastic end cap to fuse a portion of the cap into a liquid. The liquid is of a viscosity which is capable of penetrating through the pores of the filter sheet. The edges of the cylindrical sheet are then embedded in the liquified end cap so that the liquidified thermoplastic material penetrates through the pores of the embedded portions of the filter sheet material from one surface to the other. The liquid plastic is then hardened and said to form a substantially continuous leak proof matrix of end cap material permeating through the pores of the filter material and bonding the filter sheet to the end cap in a leak proof seal.

This process for applying end caps to a filter sheet has the advantage in that it does not require the use of adhesives. If this Pall et al process, however, is utilized using end caps of a hydrophobic material, and a hydrophilic membrane, an excessive percentage of the cartridges do not pass the industry integrity test. It is believed that this is due to the cartridge not being completely wetted at the interface between the hydrophilic membrane and the hydrophobic end cap. Hydrophobic type end caps may be utilized if the cartridge is integrity tested in a non-aqueous solvent. This, however, limits the application of the filter element. If a hydrophilic type end cap, e.g. polyester, is used, the cartridge will generally have inferior solvent and chemical resistance and inferior resistance to autoclaving and heat.

This Pall et al process requires that the sealing areas of the filter sheet material be porous to permit penetration of the liquified thermoplastic material through the pores of the embedded portion of the filter sheet material from one surface to the other. Additionally, during prosecution Pall et al states:

". . . The instant process is simple enough to enable rapid manufacture of filter elements with a minimum of manufacturing steps and without the necessity of employing bonding agents and components other than the actual materials of the filter and end cap. . ."

In effect Pall et al teaches away from Applicant's invention which utilizes a substantially non-porous sealing area and which utilizes other components than the actual materials of the filter and end cap.

U.S. Pat. No. 3,471,019 to Trasen et al (1969) describes a filter unit comprised of a two-part housing provided with sealing portions adapted to be aligned with each other and with a peripheral portion of the filter completely surrounding the central portions of the filter. In assembly of the unit, the sealing portions of the housings are pressed against the opposite sides of the filter and the sealing portion of at least one of the parts of the housing is heated to cause the material thereof to melt and flow through the aligned pores of the peripheral portions of the filter and fused to the sealing portion of the other part of the housing. A similar type filter and sealing method is described in U.S. Pat. No. 3,782,083 to Rosenberg (1974) wherein the plastic material runs through the pores of the filter element forming a fluid tight integral seal closing all sides of the element to fluid flow.

U.S. Pat. No. 3,487,943 to Buckman (1967) describes a filter element made of pleated filter paper. One portion of the filter element is modified so that in operation of the filter the liquid flow velocity through the modified portion is less than that through the remainder of the element. The modified portion may be formed by compressing together a series of pleats or by sealing to a group of pleats on one side of the element a sheet of similar or dissimilar filter material. The similar or dissimilar filter material is sealed to the annulus cartridge over the inner or outer periphery of the cartridge and does not form a continuous edge along the top of the filter near the end cap.

U.S. Pat. No. 3,591,010 to Pall et al (1971) describes a corrugated element having a microporous layer deposited on a substrate sheet provided with portions of reduced porosity at the areas of the base folds of the corrugations.

U.S. Pat. No. 3,815,754 to Rosenberg (1974) describes a box filter wherein the elements of the filter housing are bonded to the filter sheet by fused integration of the housing members through the open pores of the filter element, forming a fluid tight seal all along the sides of the filter sheet. Such a bond is obtained by, for example, ultrasonic welding, solvent softening or heat fusion.

U.S. Pat. Nos. 3,865,919 and 3,867,294 to Pall et al (1975) describe cylindrical elements having an improved side seam seal which can be bonded to end caps in a leak type manner.

U.S. Pat. No. 3,954,625 to Michalski (1976) describes a filter which includes a plastic housing and an intermediate filter screen. The peripheral portion of the screen is sealed between the two housing halves by flowing a portion of at least one of the housing halves through the screen and bonding that portion to the other housing half.

U.S. Pat. No. 4,101,423 to Merrill et al (1978) describes a tubular filtration element whose ends are impregnated with a suitable sealing adhesive. When the adhesive material cures, the end portion provides mechanical support for the tube and blocks the passage of the fluid or the particulate and bacterial contaminant. Merrill et al requires that the sealing material used to form the ends must be hydrophilic when cured, stating:

"If the sealant rendered the filter adjacent to it hydrophobic, the filter would not be wetted and would not then offer capillary resistance to the bubble point test gas, therefore the bubble point could not be used as an indication of filter integrity . . . " (Col. 9, lines 59–64).

"It will be understood that if the outer layer (of the filter) is formed from a lacquer impregnated paper, the resilient members can safely apply a sealing force sufficient to block the fluid from the end portions so that a hydrophobic sealing material may be used." (Col. 10, lines 6–10).

The filtration element is supported and sealed within a housing by radial seal force, i.e. the filtration element and housing are not in thermoplastic sealing relationship to each other.

U.S. Pat. No. 4,154,688 to Pall (1979) describes the use of thermoplastic end cap applied to the open ends of a filtered tube in accordance with the aforementioned U.S. Pat. No. 3,457,339 to Pall et al.

U.S. Pat. No. 4,193,876 to Leeke et al (1980) describes dryforming the peripheral portion of discs of filter media, particularly filter media containing non-compressable particulate to suppress edge leakage in filter presses.

In assignee's U.S. Ser. No. 253,345 to Southall, filed Apr. 13, 1981, now U.S. Pat. No. 4,347,208, a method is described of making a filter cell comprised of two cellulosic fiber containing filter media having a sealed periphery. The method comprises compressing the periphery of each filter media to form a flange. The media are then aligned to provide intimate face to face contact between the flanges and a spacer means provided between the media to cause each to dish outwardly from the other media. The media and spacer means are then placed into a mold surrounding the flanges. The mold has a means for providing a recompression force to the inner portions of the flanges. A thermoplastic polymer is then injected into the mold to form a seal around the flanges.

Additionally, MICRO-SCREEN filter cartridges are commericially available from AMF Cuno Division, Meriden, Conn., comprising a stainless steel pleated cylindrical screen welded to stainless steel end caps. Shim stock is welded to the screens at both ends to effectively seal off the end so that the end caps can be welded thereon without destroying the filter screen thereunder.

Still further, DURAPORE TP filter cartridges have of recent date become commericially available from Millipore Corp., Bedford, Mass. This cartridge comprises a polyvinylidene fluoride pleated cylindrical membrane fused to polypropylene end caps. Nonporous polypropylene tape is laminated to the ends of the membrane cylinder prior to pleating. The tape is apparently adhered to the membrane by partial dissolution with a solvent of the tape and/or membrane and application of sufficient pressure to the tape to mechanically bind them together. The solvent is then removed by evaporation.

In summary, in most of the prior art uncovered by applicant relating to sealing filters, the filter media sealing area is porous, so that when a thermoplastic or sealing surface is applied thereto it flows through the porous media to effect the seal. Other prior art utilizes solvents and solvent adhesives for sealing which can increase extractable contaminants (an undesirable condition when filtering parenteral or biological liquids) and damage, for example, the nylon membrane pore structure.

OBJECTS AND SUMMARY OF THE INVENTION

It is an object of this invention to provide a filter element which has an effective thermoplastic seal between a hydrophilic nylon membrane and the hydrophobic surface of the filter housing.

It is a further object of this invention to provide an effective seal without the use of adhesives.

It is still a further object of this invention to provide a filter element which is particularly useful for the filtration of aqueous fluids, in particular biological and parenteral liquids.

It is yet another object of this invention to provide a filter element comprising a fragile nylon microporous filter membrane in cylindrical form which has reinforced ends permitting the ends to be embedded in a softened thermoplastic end cap without damage to the ends and/or sealing integrity of the filter element.

It is still another object of this invention to provide a filter membrane for use in the filter element of this invention.

It is a further object of this invention to provide novel processes for producing the filter elements and filter membranes of this invention.

In accordance with the present invention, a filter element is provided which comprises:

(a) a hydrophilic nylon microporous filter membrane having a preformed substantially non-porous sealing area of non-porous tape heat sealed to the membrane; and (b) a filter housing having a hydrophobic thermoplastic sealing surface in thermoplastic sealing relationship with the sealing area.

Preferably the filter membrane is in cylindrical form having the non-porous sealing areas at each end of the cylinder and the housing having an end cap at each end of the cylinder.

The filter membrane used in the aforementioned preferred filter element comprises an elongated porous filtration area longitudinally bordered by the substantially non-porous sealing areas. This filter membrane used may be produced by preparing the filter membrane by known methods and then applying the heat sealable non-porous tape along the longitudinal borders of the filtration areas.

The filter elements of this invention are useful for the filtration of aqueous liquids, particularly parenteral or body liquids.

BRIEF DESCRIPTION OF THE DRAWINGS

FIG. 1 is a perspective view, partially broken away, of a preferred filter element of this invention.

FIG. 2 is a top view, partially in section, of the filter element of FIG. 1.

FIG. 3 is an enlarged view in section, taken along line 3—3 of FIG. 1 depicting the sealing surface between the membrane and filter element.

DETAILED DESCRIPTION OF THE INVENTION

Figure 4:
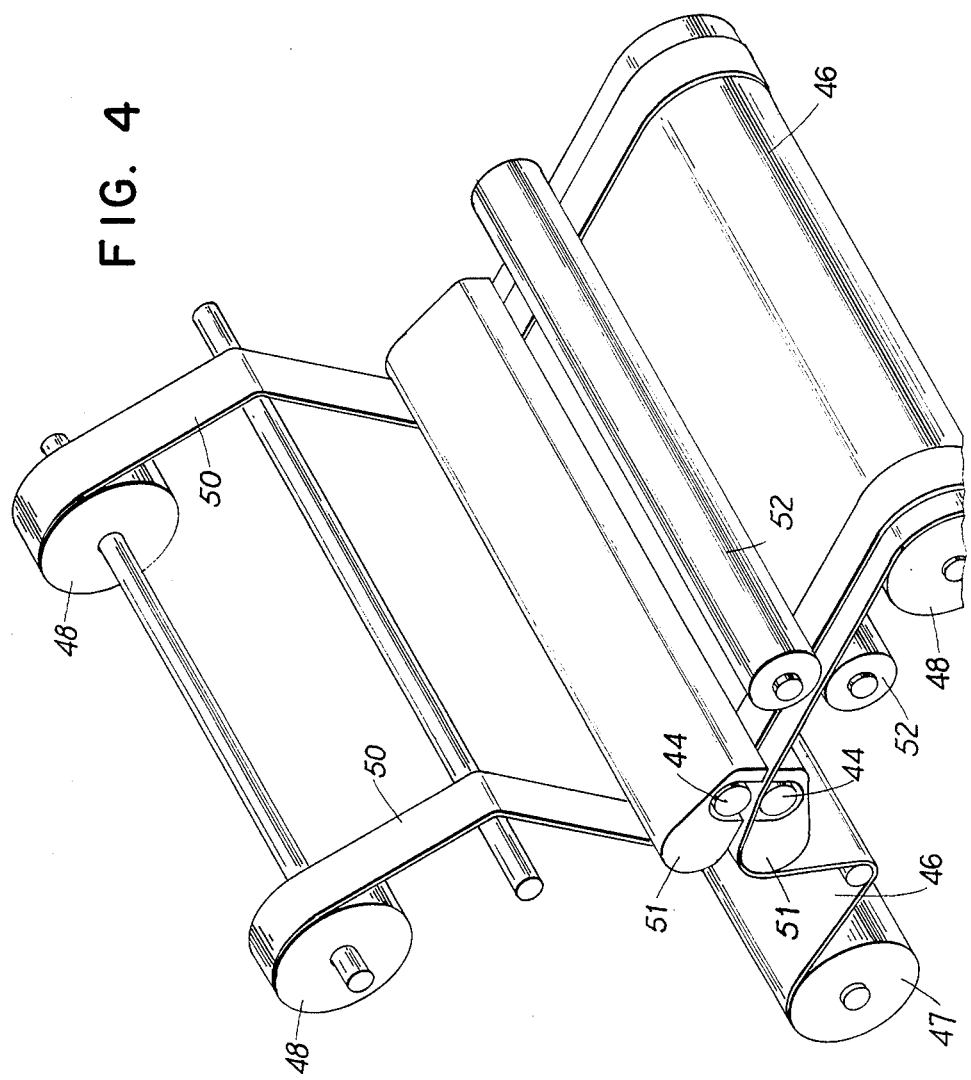
FIG. 4, is a schematic perspective of an apparatus that may be used to prepare a filter membrane by applying a non-porous tape along the longitudinal borders of the filtration area.

FIGS. 1 through 3 depict a preferred embodiment of the filter element of this invention. The filter element, generally designated (10) is comprised of the nylon filter membrane (12) and the filter housing, generally designated (14). The filter membrane is in cylindrical form having the substantially non-porous area of heat bonded non-porous tape (16) at each end of the cylinder (18). Referring to FIG. 3, the filter membrane (12) is sandwiched between inner and outer layers (20) and (22) of, for example, polypropylene woven netting.

The composite of filter membrane (12) and inner and outer layers (20 and 22) is pleated transversely to its length and formed into cylinder (18). The cylinder (18) is then slipped over a foraminous cylindrical core (24) which is provided with apertures (26) for flow into the open interior of the core (24). The filter membrane (12) and core (24) are then slipped into an outer cylindrical member (28) which is also provided with apertures (30). The ends of the cylinders are then capped by end caps (32 and 34).

The end caps (32 and 34) are sealed by thermoplastic fusion to the non-porous areas (16) of the filter membrane (12). The end caps (32 and 34) close off the interior from the exterior of the filter element. The fluid can thus flow from the outside to the interior of the filter element, since interior and exterior are completely separated by the filter element and sealed off by the end caps (32 and 34). The end caps (32 and 34) each have a central aperture (36 and 38).

The preformed end caps (32 and 34) are preferably applied to the cylindrical membrane (18) by heating an inside face of the thermoplastic end cap to a temperature sufficient to soften and preferably not liquify, a sufficient amount of the end cap to form a thermoplastic seal with the non-porous area at each end of the cylinder. All of the edges of one end of the cylinder are then embedded into the softened end cap. The softened end cap material is then hardened, typically by cooling at ambient conditions, to form a thermoplastic sealing relationship between the sealing surface of the end cap and non-porous area thereby forming a leak proof seal.

A method of applying end caps to filter elements is described in the aforementioned U.S. Pat. No. 3,457,339 to Pall et al. Such a method and apparatus described therein may be modified to apply end caps in this invention. The major differences between the method used in this invention and the Pall et al method, is that Pall et al liquifies a portion of the end cap which permeates through the porous sealing surface of the filter membrane; whereas Applicants do not require the end cap to be liquified and, as clearly indicated herein, the sealing surface of the membrane is non-porous.

End caps of thermoplastic materials are preferred because of the ease of bonding, but it is also possible to use thermosetting resins in a thermoplastic, fusable or heat softenable stage of polymerization, until bonding has been effected, after which the curing of the resin can be completed to produce a structure which can no longer be separated. Such a structure is autoclavable without danger destroying the fluid tight seal between the housing portions and the filter membrane and the end caps. Thermoplastic resins whose softening point is sufficiently high so that they are not softened under sterlizing autoclaving conditions are preferred for medical use. Exemplary of the plastic materials which can be used are polyolefins (polyethylene, polypropylene, polybutylene, polyisobutylene), polyamides, polyvinylchloride, polyvinylidene chloride, polyacrylonitrile, polyesters, polycarbonates, polymethacrylate, polyallyl, and polyoxymethylene resins. Polytetrafluoroethylene and polytrifluorochloroethylene can also be used. Polypropylene is preferred for the filtration of biological and parenteral liquids in that it can withstand autoclaving and sterilizing without discoloration or distortion. Other type materials, which may be hydrophilic, are generally unsuitable for such uses due to discoloration, distortion, etc. caused by the autoclaving and sterilization, however they may be used in conjunction with the membrane of this invention for other uses.

The hydrophilic nylon microporous filter membranes used in the filter element of this invention are well known in the art.

By the use of the term "microporous membrane" as used herein, it is meant a porous single layer, multiple layer or reinforced single or multiple layer membrane, having an effective pore size of at least 0.1 microns or larger or an initial bubble point (IBP) in water of less than 90 psi. A maximum pore size used for such membrane is about 1.2 microns or an IBP of greater than 8 psi. Preferably, but not necessarily, a single layer membrane is substantially symmetrical and isotropic. By "symmetrical", it is meant that the pore structure is substantially the same on both sides of the membrane. Asymmetric membranes, i.e., membranes having one side formed with a very tight thin layer which is supported by a more porous open structure, may also be utilized in this invention. By the use of the term "isotropic", it is meant the membrane has a uniform pore structure throughout the membrane.

The microporous nylon membranes used in this invention are hydrophilic. By the use of the term "hydrophilic", in describing the membranes, it is meant a membrane which adsorbs or adsorbs water. Generally, such hydrophilicity is produced by a sufficient amount of hydroxide (OH—) carboxyl (—COOH), amino (NH$_2$) and/or similar functional groups on the surface of the membrane. Such groups assist in the adsorption and/or absorption of the water onto the membrane, i.e. "wetting out" of the membrane. Such hydrophilicity is preferable in the filtration of aqueous fluid.

The term "nylon" is intended to embrace film forming polyamide resins including copolymers and terpolymers which include the recurring amido grouping.

While, generally, the various nylon or polyamide resins are copolymers of diamine and a dicarboxylic acid, or homopolymers of a lactam and an amino acid, they vary widely in crystallinity or solids structure, melting point, and other physical properties. Preferred nylons for use in this invention are copolymers of hexamethylene diamine and adipic acid (nylon 66), copolymers of hexamethylene diamine and sebacic acid (nylon 610), and homopolymers of poly-o-caprolactam (nylon 6). Alternatively, these preferred polyamide resins have a ratio of methylene (CH$_2$) to amide (NHCO) groups within the range about 5:1 to about 8:1, most preferably about 5:1 to about 7:1. Nylon 6 and nylon 66 each have a ratio of 6:1, whereas nylon 610 has a ratio of 8:1. The nylon polymers are available in a wide variety of grades, which vary appreciably with respect to molecular weight, within the range from about 15,000 to about 42,000 (number average molecular weight) and in other characteristics.

The highly preferred species of the units composing the polymer chain is polyhexamethylene adipamide, i.e. nylon 66, and molecular weights above about 30,000 are preferred. Polymers free of additives are generally preferred, but the addition of antioxidants or similar additives may have benefit under some conditions.

The preferred nylon microporous membranes are produced from nylon by the method disclosed in U.S. Pat. No. 3,876,738 to Marinaccio et al. Another method for producing such membranes is described in European Patent Application No. 0 005 536 to Pall. The entire disclosures of both of these references are incorporated herein by reference.

Both of these methods for producing nylon microporous membranes may be described as "quench techniques", i.e. casting or extruding a solution of a film forming polymer onto a substrate and quenching the cast film.

Broadly, Marinaccio et al produces microporous membrane by casting or extruding onto a substrate a casting solution of a film-forming polymer in a solvent system and quenching in a bath comprised of a nonsolvent system for the polymer.

The aforementioned Pall application describes another similar method which may be used for the conversion of nylon polymer into nylon microporous membrane. Broadly, Pall provides a process for preparing skinless hydrophilic alcohol-insoluble polyamide resin from a polyamide casting solution. The casting solution is formed by inducing nucleation of the solution by the controlled addition of a nonsolvent for the polyamide resin to obtain a visible precipitate of polyamide resin particles.

The casting solution, e.g. whether that of Marinaccio et al or Pall, is then spread on a substrate, i.e. reinforcing web or non-porous substrate, to form a thin film thereon. The cast film is then contacted with the quenching bath comprised of a non-solvent system for the polymer for a time sufficient to form micropores in the film. The preferred quench bath for forming a nylon microporous membrane comprises a nonsolvent system of methanol and water or formic acid and water.

These preferred nylon membranes, i.e. described in Marinaccio et al and Pall, are characterized by an isotropic structure, having a high effective surface area and a fine internal microstructure of controlled pore dimensions with narrow pore size distribution and adequate pore volume. For example, a representative 0.22 micron rated nylon 66 membrane (polyhexamethylene adipamide) exhibits an Initial Bubble Point (IBP) of about 45 to 50 psid, a Foam All Over Point (FAOP) of about 50 to 55 psid, provides a flow of from 70 to 80 ml/min of water at 5 psid (47 mm.diameter discs), has a surface area (BET, nitrogen adsorption) of about 13 $m^2/g$ and a thickness of about 4.5 to 4.75 mils.

In general, nylon microporous filter membranes are be cast at thicknesses in the range of from about 1 mil to about 20 mils, preferably from about 1 to about 10 mils (wet thickness). After the polymer solution is cast and quenched, the membrane is removed from the quench bath and substrate upon which it was cast and then washed.

The washed membrane is then, preferably, laminated to another washed membrane, or optionally laminated to a web by methods well known in the art, to form a reinforced laminated filtration membrane. A unique reinforced membrane is described and claimed in U.S. Ser. No. 332,068 to Barnes et al filed Dec. 18, 1981, now abandoned, the entire disclosure of which is incorporated herein by reference. Preferably, lamination is accomplished by passing the plurality of layers juxtaposed upon each other through heated rollers to heat laminate and dry the membranes together. Preferably such drying is under restraint to prevent shrinkage. Drying of the membranes under restraint is described in the Assignee's copending U.S. Ser. No. 201,086 to Repetti, filed Oct. 27, 1980, now abandoned. The entire disclosure of this application is incorporated herein by reference. Generally, any suitable restraining technique may be used while drying, such as winding the membrane tightly about a dry surface, e.g. a drum. Biaxial control is preferred and tensioning the laminated membrane is considered the most preferred.

The final drying and curing temperature for the filtration membrane should be sufficient to dry and cure the membranes. Preferably this temperature is from about 120° C. to 140° C. for minimization of drying time without embrittlement or other detrimental effects to the membranes. The total thickness of the filtration membrane is preferably from about 3 mils to about 30 mils and most preferably about 5 to 15 mils thick (dry thickness).

The filtration membrane may then be rolled and stored under ambient conditions for further processing. Preferably, after formation of the membrane but prior to forming the membrane into the filtration membrane of this invention, it may be treated in accordance with U.S. Ser. No. 314,307, filed Oct. 23, 1981 to Ostreicher et al, now U.S. Pat. No. 4,473,474, to produce a cationically charged modified microporous membrane particularly suitable for the filtration of parenteral or biological liquids; or in accordance with U.S. Ser. No. 268,543, filed May 29, 1981 to Barnes et al, now U.S. Pat. No. 4,473,475, to produce another type cationically charged modified microporous membrane, particularly suitable for the filtration of high purity water, i.e. at least 18 megohm-cm resistivity, required in the manufacture of electronic component. The entire disclosures of both of these applications are incorporated herein by reference.

The preferred form of the nylon filter membrane is an elongated porous filtration area bordered by substantially non-porous sealing areas of non-porous tape heat sealed to the membrane. This membrane is then pleated transversely to its length and formed into cylinder. It has been found that the objects of this invention may be achieved by application of the tape to only one face of the membrane, although the tape may be applied to both faces.

In order to produce this preferred form of the filter membrane, the apparatus of FIG. 4 may be utilized. The apparatus broadly comprises a pair of laminating rollers (44) through which the nylon microporous membrane (46) passes, supplied from roller (47). The membrane may be produced by any of the methods well known in the art, preferably by the aforementioned Marinaccio et al process. Tape supply rollers (48) feed non-porus tape (50) across heat shoes (51) and along the longitudinal borders just prior to the entrance of the membrane (46) into rollers (44). The heat shoes (51) are heated to temperatures which are sufficient to soften the solventless adhesive applied to the underside of tape (50) and allow bonding of the tape to the membrane (46) upon cooling. Such temperatures depend upon the specific nylon used, the tape, tape thickness, adhesive, etc. The shoes (51), in order to more accurately control the process and prevent damage to the membrane, may each be individually heated to different temperatures. Rollers (44) apply forces along the longitudinal borders of the membrane to heat seal the tape (50) to the borders of the membrane (46). The membrane (46) is then conveyed through pull rollers (52) to take up roller (48). An apparatus which has been found to be particularly suited for such procedure is a modified Model No. 25 from Laminex, Inc., Mathews, N.C. The apparatus is modified to accept two tape feed rollers (48) rather than a single roller the full width of the apparatus.

By the use of the term "heat sealable . . . tape" it is meant a tape which can be heat sealed on one surface to a nylon membrane substrate. Preferably, the tape is coated with a solventless melt adhesive which melts at a temperature which is lower than the melt temperature of the tape material or nylon membrane, and which upon cooling, is capable of bonding the tape to the nylon membrane. The solventless hot melt adhesive should not have such a low melt temperature that it will not adhesively function at typical heat sterilization and autoclave temperatures, e.g. above about 100° C. Such hot melt adhesives are, for example, polyamides and polyolefin type adhesives. A preferred adhesive is polyethylene.

Preferably the tape utilized is a polyester type tape, however, any polymeric tape may be utilized which is non-porous, can withstand the temperatures of use, autoclaving and sealing and does not produce detrimental extractables. Other tapes suitable for such use are polyamides, polyolefins etc. A commercially available and preferred tape having a hot melt adhesive thereon is sold under the trademark PERMALAM 150 by Laminex Inc. and is a polyester tape having a solventless hot melt adhesive of polyethylene. When using this specific tape the heat shoe in contact with the membrane is heated to about 200° F. (93° C.) and the heat shoes in contact with the tape is heated to about 300° F. (149° C.).

Scanning Electron Micrographs of the sealing area of the membrane produced by heat sealing the polyester tape to the borders of the membrane indicate that the tape completely blocks the surface pores of the membrane without significant penetration into the porous membrane. Thus the tape prevents entry into the pores by the softened material of the end cap which is subsequently applied and reinforces the membrane, thus decreasing the opportunity for degradation of the membrane by heat and mechanical stress during production.

The filter element of this invention can thus utilize the preferred hydrophobic filter housing, e.g. polypropylene, is simple and economical to manufacture, and has no solvents employed in manufacturing to adhere the tape to the membrane or the filter housing to the membrane. The tape also adds to the structural rigidity of the membrane.

For so called sterile filtrations, involving biological liquids, the filter element is sanitized or sterilized by autoclaving or hot water flushing prior to use. The filtration element and membrane of this invention are resistant to this type treatment, and retain their integrity under such conditions. Additionally, the filter element of this invention can withstand numerous wetting and drying cycles and high forward flow (FIG. 1) and reverse flow (not shown) pressures without failure.

What is claimed is:

1. A filter cartridge for filtration of aqueous liquids comprising:
    (a) at least one end cap having a sealing surface made of hydrophobic thermoplastic material;
    (b) a hydrophilic microporous nylon membrane in sheet form and having at least one edge;
    (c) a netting layer on at least one side of said membrane;
    (d) a non-porous heat-sealing tape extending along said at least one edge of said membrane and bonded thereto;
    (e) said membrane and netting layer being folded to form a pleated filtering surface;
    (f) said tape forming a sealing layer along at least one peripheral end of said filtering surface and being partially embedded and thermoplastically sealed within said sealing surface of said end cap; and
    (g) said tape substantially blocking micropores on said edge of said hydrophilic membrane to minimize adsorption of hydrophobic thermoplastic material along said peripheral end of said filtering surface during a thermoplastic sealing process when the filter cartridge is manufactured, so that aqueous liquids to be filtered can thoroughly and completely wet said hydrophilic membrane along said peripheral end of said filtering surface.

2. A filter cartridge as claimed in claim 1 wherein said tape extends along opposing edges of said membrane.

3. A filter cartridge as claimed in claim 1 wherein said filter cartridge further comprises a filter housing in the form of a cage which structurally encloses said membrane.

4. A filter cartridge as claimed in claim 1 wherein said tape comprises a melt adhesive which is polyethylene.

5. A filter cartridge as claimed in claim 1 wherein said membrane has a pore size of about 0.2 to about 0.85 microns.

6. A filter cartridge as claimed in claim 1 wherein said netting layer is on both sides of said membrane.

7. A filter cartridge as claimed in claim 1 wherein said tape is disposed between said membrane and netting layer.

* * * * *